(12) United States Patent
Chen

(10) Patent No.: US 6,517,956 B1
(45) Date of Patent: Feb. 11, 2003

(54) MAGNETO-RESISTANCE RECORDING MEDIA COMPRISING ALUMINUM NITRIDE CORROSION BARRIER LAYER AND A C-OVERCOAT

(75) Inventor: Ga-Lane Chen, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/499,046

(22) Filed: Feb. 7, 2000

Related U.S. Application Data
(60) Provisional application No. 60/132,280, filed on May 3, 1999.

(51) Int. Cl.[7] .............................. G11B 5/66; G11B 5/72
(52) U.S. Cl. ..................... 428/668; 428/678; 428/651; 428/332; 428/694 TP; 428/694 TS; 428/694 TC; 428/694 TM
(58) Field of Search ................ 428/64, 678, 694 TP, 428/694 TC, 694 TS, 694 TM, 332, 651, 668, 652

(56) References Cited

U.S. PATENT DOCUMENTS

| | | | |
|---|---|---|---|
| 4,839,244 A | | 6/1989 | Tsukamoto |
| 5,741,577 A | * | 4/1998 | Yamamoto et al. .......... 428/212 |
| 5,763,071 A | * | 6/1998 | Chen et al. .................. 428/332 |
| 5,780,135 A | | 7/1998 | Kikitsu et al. |
| 5,871,841 A | * | 2/1999 | Kuratomi .................... 428/332 |
| 5,930,077 A | * | 7/1999 | Obata et al. ................. 360/122 |
| 6,001,447 A | * | 12/1999 | Tanahashi et al. .......... 428/336 |
| 6,033,772 A | * | 3/2000 | Lo et al. ..................... 428/332 |
| 6,071,607 A | * | 6/2000 | Okuyama et al. ........... 428/332 |
| 6,143,388 A | * | 11/2000 | Bian et al. .................. 360/128 |
| 6,150,015 A | * | 11/2000 | Bertero et al. .............. 428/332 |

FOREIGN PATENT DOCUMENTS

WO  WO 95/23878  *  9/1995

* cited by examiner

*Primary Examiner*—Paul Thibodeau
*Assistant Examiner*—Kevin M Bernatz
(74) *Attorney, Agent, or Firm*—McDermott, Will & Emery

(57) ABSTRACT

A magnetic recording medium is provided with a dual layer protective overcoat system comprising an AlN corrosion barrier layer and a protective carbon layer thereon. The AlN layer effectively prevents or significantly reduces Co diffusion to the medium surface. Embodiments include magnetic recording media comprising an AlN corrosion barrier layer over a magnetic layer and a layer of amorphous hydrogenated carbon, amorphous nitrogenated carbon, amorphous hydrogen-nitrogenated carbon, ion-beam deposited carbon or cathodic-arc-deposited carbon on the AlN corrosion barrier layer. Embodiments further include magnetic recording media comprising a Ni—P plated substrate having sequentially deposited thereon a seedlayer, an intermediate Cr or Cr alloy layer, a Cr alloy underlayer, a non-magnetic CoCr grain epitaxy layer, a first magnetic layer comprising Co, Cr and Ta without Pt, a second magnetic layer comprising Co, Cr and Pt, the AlN corrosion barrier layer at a thickness of about 25 Å to about 50 Å and the protective carbon layer at a thickness of about 25 Å to about 50 Å.

7 Claims, 3 Drawing Sheets

MAGNETO-RESISTANCE RECORDING MEDIA COMPRISING ALUMINUM NITRIDE CORROSION BARRIER LAYER AND A C-OVERCOAT

RELATED APPLICATIONS

This application claims priority from provisional patent application Ser. No. 60/132,280 filed May 3, 1999, entitled "ALUMINUM NITRIDE THIN FILM AS A CORROSION BARRIER FOR THIN FILM DISK," the entire disclosure of which is hereby incorporated by reference herein.

TECHNICAL FIELD

The present invention relates to magnetic recording media, particularly rotatable magnetoresistance (MR) or giant magnetoresistance (GMR) recording media, such as thin film magnetic disks cooperating with a magnetic transducer head. The present invention has particular applicability to high areal density magnetic recording media designed for drive programs having reduced flying height, or pseudo-contact/proximityrecording.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too smooth, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers. The surface of an underlayer can also be textured, and the texture substantially replicated in subsequently deposited layers.

Conventional longitudinal recording media typically comprise a substrate, such as aluminum (Al) or an Al alloy, e.g., aluminum-magnesium (Al-Mg) alloy, plated with a layer of amorphous nickel-phosphorus (NiP). Alternative substrates include glass, ceramic, glass-ceramic, and polymeric materials and graphite. The substrate typically contains sequentially deposited on each side thereof at least one underlayer, such as chromium (Cr) or a Cr-alloy, e.g., chromium vanadium (CrV), a cobalt (Co)-base alloy magnetic layer, a protective overcoat typically containing carbon, and a lubricant. The underlayer, magnetic layer and protective overcoat, are typically sputter deposited in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective overcoat to prevent wear between the disk and head interface during drive operation. Excessive wear of the protective overcoat increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

A conventional material employed for the lubricant topcoat comprises a perfluoro polyether (PFPE) which consists essentially of carbon, fluorine and oxygen atoms. The lubricant is typically dissolved in an organic solvent, applied and bonded to the carbon overcoat of the magnetic recording medium by techniques such as dipping, buffing, thermal treatment, ultraviolet (UV) irradiation and soaking.

The escalating requirements for high areal recording density impose increasingly greater requirements on thin film magnetic recording media in terms of coercivity, stiction, squareness, medium noise and narrow track recording performance. In addition, increasingly high areal recording density and large-capacity magnetic disks require smaller flying heights, i.e., the distance by which the head floats above the surface of the disk in the CSS drive (head-disk interface). For conventional media design, a decrease in the head to media spacing increases stiction and drive crash, thereby imposing an indispensable role on the carbon-protective overcoat.

There are various types of carbon, some of which have been employed for a protective overcoat in manufacturing a magnetic recording medium. Such types of carbon include hydrogenated carbon, graphitic carbon or graphite, and nitrogenated carbon or carbon nitride and hydrogen-nitrogenated carbon. These types of carbon are well known in the art and, hence, not set forth herein in great detail.

Generally, hydrogenated carbon or amorphous hydrogenated carbon has a hydrogen concentration of about 5 at. % to about 40 at. %, typically about 20 at. % to about 30 at. %. Hydrogenated carbon has a lower conductivity due to the elimination of the carbon band-gap states by hydrogen. Hydrogenated carbon also provides effective corrosion protection to an underlying magnetic layer. Amorphous carbon nitride, sometimes referred to as nitrogenated carbon, generally has a nitrogen to hydrogen concentration ratio of about 5:20 to about 30:0. Hydrogen-nitrogenated carbon generally has a hydrogen to nitrogen concentration ratio of about 30:10 to 20:10 (higher concentration of hydrogen than nitrogen). Amorphous (a) hydrogen-nitrogenated carbon can be represented by the formula a-$CH_xN_y$, wherein "x" is about 0.05 (5.0 at. %) to about 0.20 (20 at. %), such as about 0.1 (10 at. %) to about 0.2 (20 at. %), and "y" about 0.03 (3.0 at. %) to about 0.30 (30 at. %), such as about 0.03 (3.0 at. %) to about 0.07 (7.0 at. %). A particularly suitable composition is a-$CH_{0.15}N_{0.05}$. Graphitic carbon or graphite contains substantially no hydrogen and nitrogen.

The drive for high areal recording density and, consequently, reduced flying heights, challenges the capabilities of conventional manufacturing practices. For example, a suitable protective overcoat must be capable of preventing corrosion of the underlying magnetic layer, which is an electrochemical phenomenon dependent upon factors such as environmental conditions, e.g., humidity and temperature. In addition, a suitable protective overcoat must prevent migration of ions from underlying layers into the lubricant topcoat and to the surface of the magnetic recording medium forming defects such as asperities. A protective overcoat must also exhibit the requisite surface for wear resistance, lower stiction, and some polarity to enable bonding thereto of a lubricant topcoat in an adequate thickness.

Furthermore, as the head disk interface decreases to less than about 1 μinch, it is necessary to reduce the thickness of the carbon-containing protective overcoat to below about 100 Å, e.g., below about 75 Å, in order to improve the performance of the magnetic recording and reduce the spacing loss between the read/write head and magnetic recording medium surface. However, when the thickness of the carbon-containing protective overcoat is reduced to below about 75 Å, corrosion becomes a significant issue and head crash is encountered because the protective overcoat exhibits very poor tribological properties and low reliability. Most GMR and MR media overcoats comprise a single layer of carbon material, such as amorphous hydrogenated carbon or amorphous nitrogenated carbon and exhibit adequate reliability at a thickness of about 125 Å to about 250 Å. However, as the thickness of the carbon-containing overcoat is reduced to below about 75 Å, head crash occurs, presumably because of lower wear resistance and the discontinuities formed in the sputter deposited layer. In addition, corrosion becomes a significant factor in that Co diffuses through the thin protective overcoat to the medium surface.

Kikitsu et al. in U.S. Pat. No. 5,780,135 disclose magnetic recording media containing a protective layer made of any of various compounds inclusive of aluminum nitride. Tsukamoto in U.S. Pat. No. 4,839,244 discloses magnetic recording media comprising a protective coating containing graphite fluoride and an inorganic oxide, carbide or nitride, such as aluminum nitride.

There exists a continuing need for magnetic recording media comprising a protective overcoat capable of satisfying the imposing demands for high areal recording density, corrosion resistance and reduced head-disk interface. There also exists a particular need for an MR or a GMR magnetic recording medium having a protective overcoat with a thickness of less than about 75 Å with excellent tribological properties at very low glide heights and long term durability.

DISCLOSURE OF THE INVENTION

An advantage of the present invention is an effective MR or GMR magnetic recording medium comprising a protective overcoat exhibiting excellent tribological properties at very low glide heights, good corrosion resistance and long term durability.

Another advantage of the present invention is a magnetic recording medium comprising a protective overcoat having a thickness of less than about 75 Å and exhibiting excellent tribological properties at very low glide heights and superior corrosion resistance.

Additional advantages and other features of the present invention will be set forth in part in the description which follows and in part will become apparent to those having ordinary skill in the art upon examination of the following disclosure or may be learned from the practice of the present invention. The advantages of the present invention may be realized and obtained as particularly pointed out in the appended claims.

According to the present invention, the foregoing and other advantages are achieved in part by a magnetic recording medium having a dual layer protective overcoat over a magnetic layer, the dual layer protective overcoat comprising: a layer of aluminum nitride (AlN) over the magnetic layer; and a carbon-containing layer on the AlN layer.

Embodiments of the present invention comprise magnetic recording media having a dual layer protective overcoat at a thickness less than about 75 Å. Embodiments include depositing the AlN layer, which serves as a corrosion barrier layer, at a thickness of about 10 Å to about 50 Å, e.g., about 25 Å to about 50 Å, and depositing the carbon layer, which serves as a protective layer, at a thickness of about 10 Å to about 50 Å, e.g., at about 25 Å to about 50 Å, on the AlN corrosion barrier layer. Embodiments of the present invention further comprise sequentially depositing on a nickel-phosphorous plated substrate, a seedlayer, such as nickel aluminum (NiAl) or oxidized NiAl, a Cr or Cr alloy intermediate layer, a Cr alloy underlayer, a non-magnetic grain epitaxial layer comprising Co and Cr, a first magnetic layer comprising Co, Cr, Ta, and a second magnetic layer comprising Co, Cr and platinum (Pt). A conventional solid lube and/or mobile lube layer, such as a perfluoropolyether, is applied to the dual layer protective overcoat of the present invention.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

Figure 1:
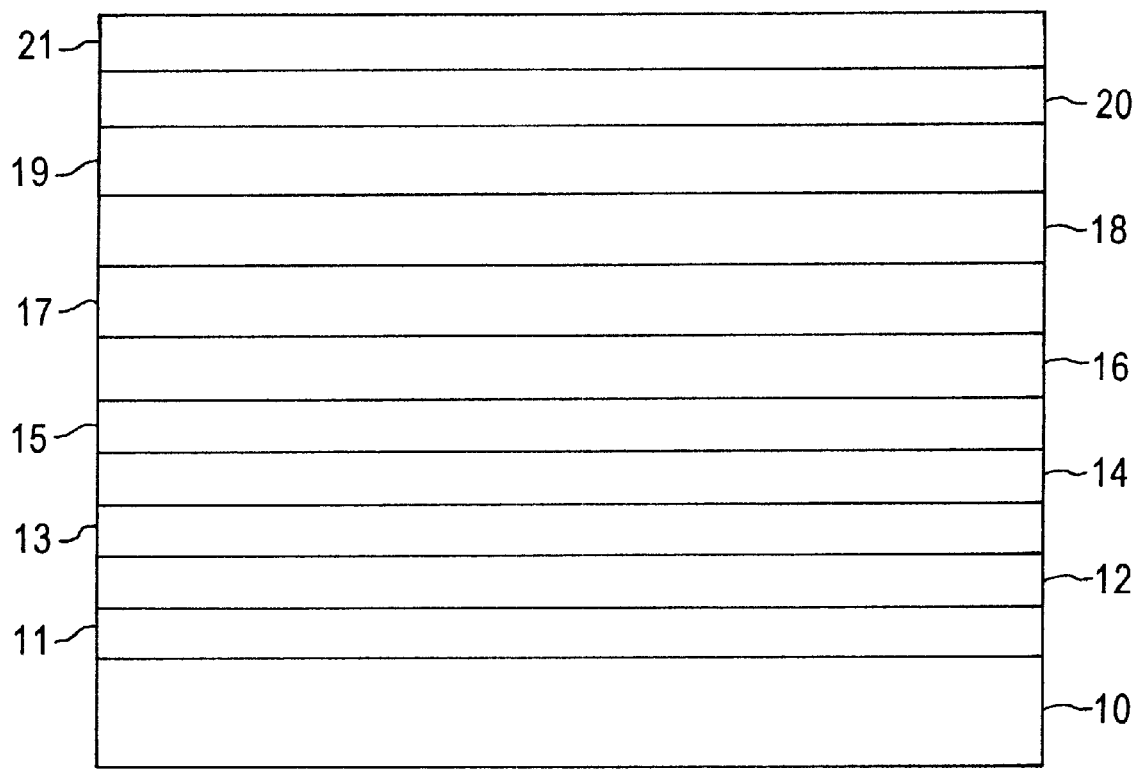
FIG. 1 schematically illustrates a magnetic recording medium in accordance with an embodiment of the present invention.

The present invention enables the manufacture of MR and GMR magnetic recording media containing a dual protective overcoat system having a thickness less than about 75 Å, which media exhibit superior corrosion resistance, excellent tribological properties at a very low glide height, e.g., below about 1 μ inch, and long term durability. Embodiments of the present invention, therefore, enable the manufacture of MR and GMR magnetic recording media with good corrosion resistance, improved magnetic recording performance and reduced spacing loss between the read/write head and magnetic recording surface by reducing the overcoat thickness to even less than 75 Å, e.g., less than about 50 Å.

Embodiments of the present invention comprise forming a dual layer protective overcoat system by sputter depositing an AlN layer, for example, an AlN layer containing about 30 to about 70 at. % nitrogen, over a magnetic layer. The Al layer serves as a corrosion barrier layer preventing or significantly reducing corrosion by preventing or significantly reducing Co migration to the media surface. The AlN corrosion barrier layer can be deposited as a thickness of about 10 Å to about 50 Å, such as about 25 Å to about 50 Å, e.g. about 25 Å. A protective carbon-containing layer is then deposited on the A IN corrosion barrier layer. The protective carbon-containing layer can comprise any of various diamond-like carbon (DLC) overcoats, such as amorphous hydrogenated carbon (a-C:H), amorphous nitrogenated carbon (a-C:N), amorphous hydrogenated-nitrogenated carbon (a-C:HN), ion-beam deposited carbon (i-DC) or cathodic-arc-deposited carbon (cad-C). The protective carbon layer can be deposited at a thickness of about 10 Å to about 50 Å, such as about 25 Å to about 50 Å, e.g., about 25Å.

Embodiments of the present invention comprise magnetic recording media with an initial solid lube layer on the carbon-containing protective layer, and a conventional mobile lube layer, such as a perfluoropolyether lubricant, e.g., Z-DOL®, Z-TETRAOL® or AM201® to enhance tribology and durability of the head-disk interface. The solid lube layer can be deposited at a suitable thickness, such as 10 Å to about 30 Å, while the mobile lube layer can be deposited at a suitable thickness, such as about 5 Å to about 15 Å. Magnetic recording media in accordance with the present invention can comprise any conventional substrate, such as NiP/Al or an NiP/Al alloy substrate, Al or an Al alloy substrate, or a glass, ceramic, glass-ceramic or polymeric substrate.

Advantageously, the dual layer protective overcoat system of the present invention effectively prevents corrosion of the underlying magnetic layer and prevents migration of ions from underlying layers. The exact operative mechanism enabling the formation of a uniform, continuous protective overcoat, at a thickness of less than about 75 Å, e.g., less than 50 Å, while providing good corrosion resistance and avoiding head crash is not known with certainty. However, it is believed that the initially deposited AlN layer serves as a protective corrosion barrier preventing the migration of ions, such as Co, and also enables the formation of a protective carbon-containing layer having a uniform thickness without discontinuities or voids, thereby providing excellent tribological properties at a very low glide height, e.g., less than about 1 μinch, with long term durability.

Embodiments of the present invention comprise sequentially depositing on each side of a non-magnetic substrate, such as a substrate containing an electrolessly deposited or sputtered NiP layer, a seedlayer, such as NiAl or an oxidized NiAl seedlayer at a thickness of about 50 Å to about 1000 Å, e.g., 800 Å for a glass substrate, an intermediate layer at a thickness of about 100 Å to about 300 Å, e.g., about 150 Å, comprising chromium or an alloy of chromium with one or more of tungsten, molybdenum, vanadium, titanium, or oxygen (e.g., chromium oxide), an underlayer having a thickness of about 50 Å to about 150 Å, comprising a Cr alloy, such as chromium-tungsten or chromium-vanadium, a non-magnetic grain epitaxy layer comprising cobalt-chromium or cobalt-chromium and at least one of tantalum, molybdenum, tungsten, vanadium, niobium, or titanium, at a thickness of about 10 Å to about 50 Å, e.g., about 30 Å; a first magnetic layer, such as a cobalt-chromiumtantalum layer containing one or more of boron, nickel, niobium, tungsten and molybdenum, without platinum, at a thickness of about 50 Å to about 200 Å; and a second magnetic layer comprising cobalt-chromium-platinum and at least one of tantalum, niobium, boron, nickel, molybdenum, tungsten, vanadium, carbon and nitrogen, at a thickness of about 50 Å to about 200Å.

Experiments were conducted on magnetic recording media prepared with substantially the same layers in substantially the same manner except for the presence of an AlN corrosion barrier layer. The testing revealed that magnetic recording media containing the AlN corrosion barrier layer in accordance with the present invention exhibited superior corrosion resistance and successfully past 20,000 cycles of contact-start-stop (CSS) testing; whereas, the corresponding media without the AlN layer exhibited poor corrosion resistance and crashed within 20,000 cycles.

An embodiment of the present invention is schematically illustrated in FIG. 1 and comprises: a substrate 10, e.g., Al, an Al alloy, a polymer, a glass, a ceramic, or a glass-ceramic; an electrolessly plated or a sputter deposited NiP coating 11 on substrate 10; a seedlayer 12, such as NiAl or oxidized NiAl; an intermediate layer 13, e.g., chromium or an alloy of chromium with tungsten, molybdenum, vanadium, titanium or chromium oxide; an underlayer 14, e.g., chromium-tungsten or chromium-vanadium; a non-magnetic grain epitaxial layer 15, e.g., an alloy of Co and Cr containing about 37 at. % to about 43 at. % Cr or an alloy of Co, Cr and tantalum, molybdenum, tungsten, vanadium or titanium; a first magnetic layer 16, e.g., an alloy of Co, Cr, tantalum and boron, nickel, niobium, tungsten or molybdenum; a second magnetic layer 17, e.g., an alloy of Co, Cr, Pt and one or more of tantalum, niobium, boron, nickel, molybdenum, tungsten, vanadium, carbon and nitrogen; AlN corrosion barrier layer 18; protective carbon-containing layer 19; solid lube layer 20; and mobile lube layer 21. It should be recognized that layers 11 through 21 are sequentially deposited on both sides of substrate 10 although, for illustrative clarity, FIG. 1 illustrates the sequential formation of layers 11 through 21 on one side of substrate 10.

EXAMPLES

Comparison testing was performed on a plurality of media. Each medium contained similar layers as was prepared in a similar manner, except that one group of media contained an AlN film reactively sputtered in a gas mixture of argon and nitrogen at a thickness of about 25 Å. Testing revealed that magnetic recording media in accordance with the present invention containing the AlN corrosion barrier layer exhibited superior corrosion protection and successfully passed 20,000 cycles of CSS testing; whereas media without the AlN corrosion barrier layer exhibited unacceptable corrosion and also crashed within 20,000 cycles.

Figure 2:
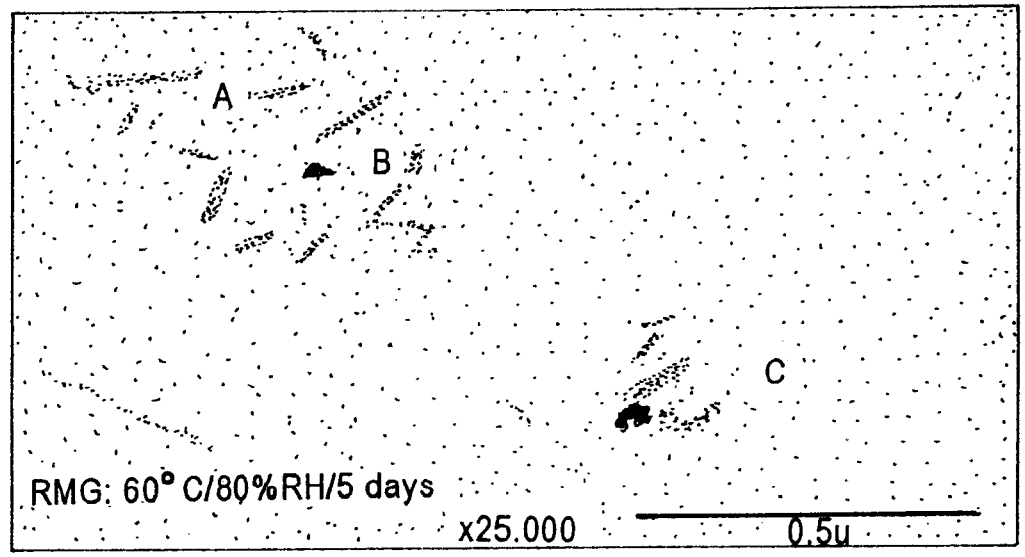
FIG. 2 is a scanning electron micrograph (SEM) for a conventional magnetic recording medium with a carbon overcoat.
Figure 2:
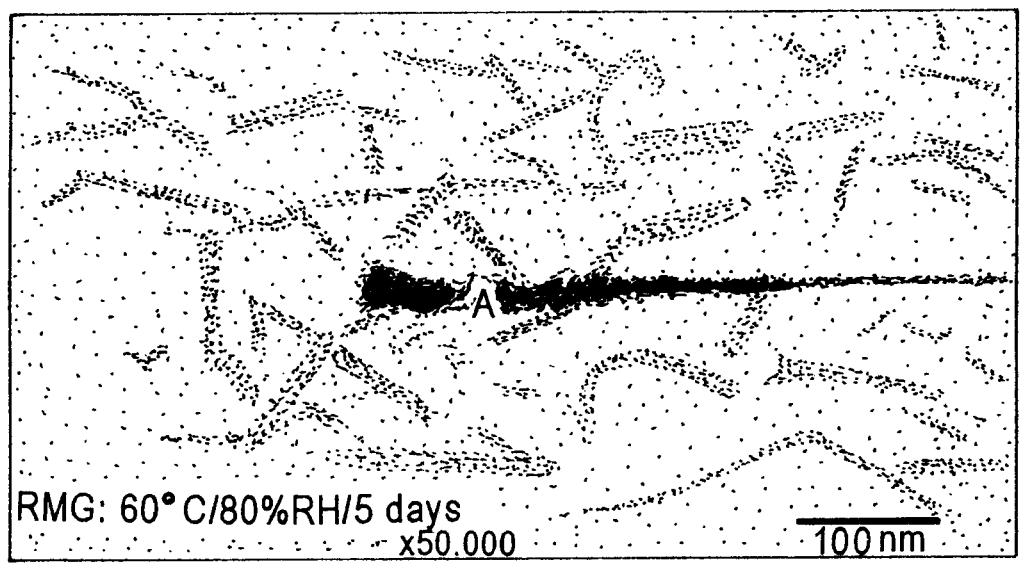

FIG. 2 is a SEM for a conventional cheeta 18 XL disk with a carbon overcoat after 60° C., 80% relative humidity after 5 days of testing in an environmental test chamber. Due to the lack of complete coverage, it is apparent that particles are coming out of the mechanical texture cross-hatch spot or disk pinholes. These particles are cobalt and nickel accumulated around defect centers.

Figure 3:
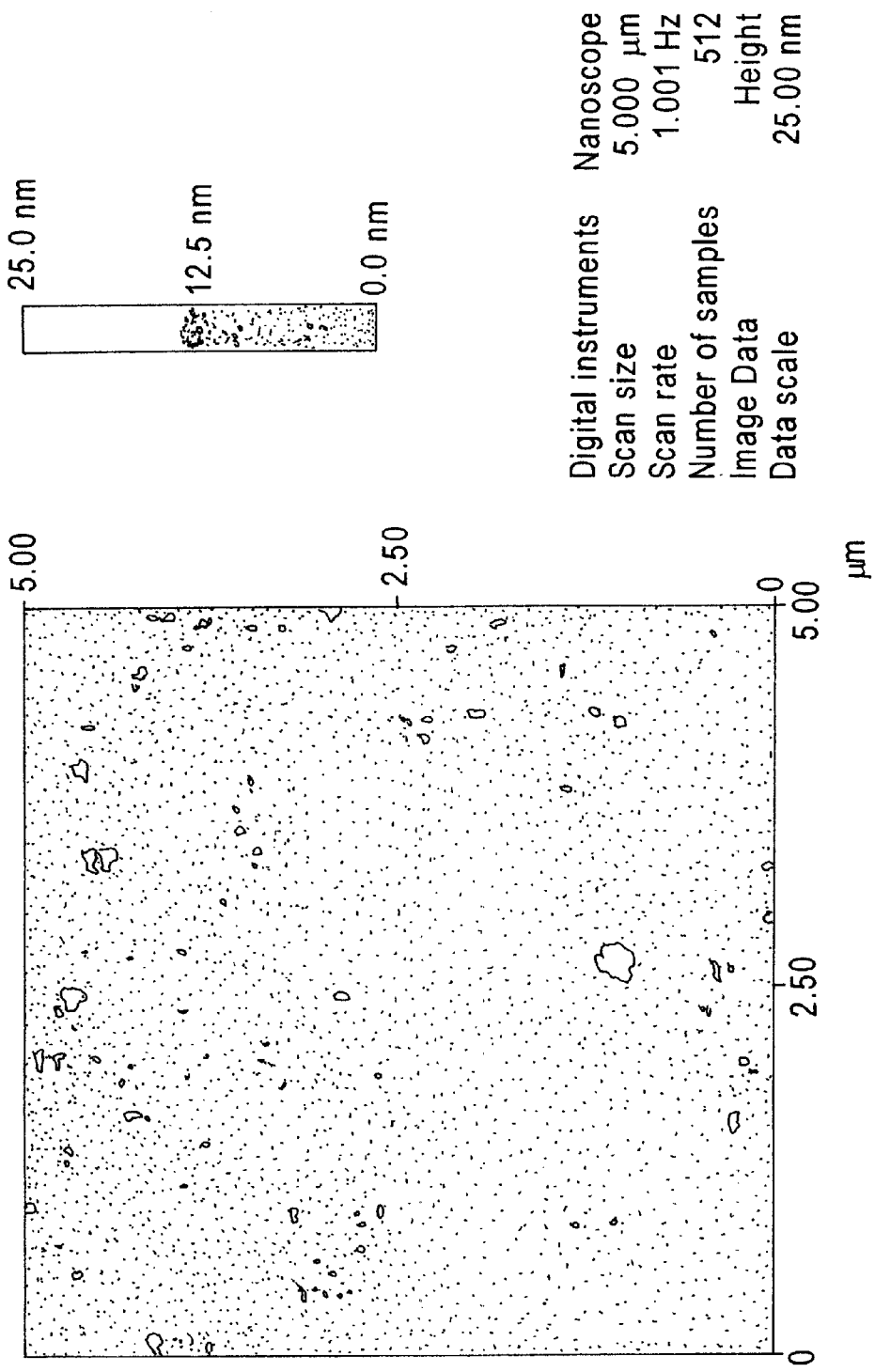
FIG. 3 is an atomic force micrograph (AFM) of a medium in accordance with an embodiment of the present invention.

FIG. 3 is an AFM for a disk having a 25 Å AlN corrosion barrier after 60° C. and 80% relative humidity after 5 days of testing in an environmental test chamber. It is apparent that due to the complete coverage of AlN, there are no particles coming out from the mechanical polishing lines, texture cross-hatch spots or disk pinholes. A comparison of FIGS. 2 and 3 illustrates the dramatic impact of a 25 Å corrosion barrier layer of AlN between the magnetic layer and protective carbon layer.

The present invention provides magnetic recording media having a protective overcoat system at a thickness significantly less than 75 Å, e.g. less than 50 Å, for MR and MRG recording without encountering head crash, by providing an AlN corrosion barrier layer between a magnetic layer and a protective carbon layer. Magnetic recording media in accordance the present invention exhibit good corrosion resistance and excellent tribological properties at very low glide heights, e.g., less than about 1 μinch, good corrosion resistance and long term durability.

The present invention enjoys industrial utility in manufacturing any of various types of magnetic recording media, including thin film disks. The present invention is particularly applicable in producing high areal recording density magnetic recording media requiring a low flying height.

Only the preferred embodiment of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium having a dual layer protective overcoat over a magnetic layer, the dual layer protective overcoat comprising:
    a layer of aluminum nitride (AlN) over the magnetic layer; and
    a carbon-containing layer on the AlN layer, wherein the dual protective overcoat has a thickness of about 75 Å or less,
    the magnetic recording medium further comprising:
        a substrate comprising aluminum or an aluminum alloy, a glass, ceramic, glass-ceramic or polymeric material, or a metal-plastic composite, the substrate having a nickel-phosphorous plating thereon;
        a seedlayer on the substrate, the seedlayer comprising nickel-aluminum (NiAl) or oxidized NiAl;
        an intermediate layer on the seedlayer, the intermediate layer comprising chromium (Cr) or an Cr alloy;
        an underlayer on the intermediate layer, the underlayer comprising a Cr alloy;
        a non-magnetic grain epitaxy layer on the underlayer, the non-magnetic grains expitaxy layer comprising a cobalt-chromiumn alloy;
        a first magnetic layer on the non-magnetic grain epitaxy layer, the first magnetic layer comprising a cobalt-chromium-tantalum alloy without platinum;
        a second magnetic layer comprising a cobalt-chromium-platinum alloy, wherein
            the dual layer protective overcoat is on the second magnetic layer; and
            a lubricant topcoat on the dual layer protective overcoat.

2. The magnetic recording medium according to claim 1, wherein:
    the carbon-containing layer comprises amorphous hydrogenated carbon (a-C:H), amorphous nitrogenated carbon (a-C:N), amorphous hydrogen-nitrogenated carbon (a-C:H$_b$N$_c$), ion-beam deposited carbon (ibd-C), or cathodic-arc-deposited carbon (cad-C).

3. The magnetic recording medium according claim 1, wherein:
    the AlN layer has a thickness of about 10 Å to about 50 Å; and
    the carbon-containing layer has a thickness of about 10 Å to about 50Å.

4. The magnetic recording medium according to claim 1, wherein the lubricant topcoat comprises a solid lube layer having a thickness of about 10 Å to about 30 Å.

5. The magnetic recording medium according to claim 4, wherein the lubricant topcoat further comprises a mobile lube layer having a thickness of about 5 Å to about 15 Å on the solid lube layer.

6. The magnetic recording medium according to claim 1, wherein:
    the intermediate layer comprises chromium-tungsten, chromium-molybdenum, chromium-vanadium, chromium-titanium or chromium-oxide;
    the underlayer comprises chromium-tungsten or chromium-molybdenum;
    the non-magnetic grain epitaxy layer comprises cobalt-chromium, or cobalt, chromium and one or more elements selected from the group consisting of tantalum, molybdenum, tungsten, vanadium, niobium and titanium;
    the first magnetic layer comprises an alloy of cobalt-chromium, tantalum and at least one element selected from the group consisting of boron, nickel, niobium, tungsten and molybdenum; and
    the second magnetic layer comprises an alloy of cobalt, chromium, platinum and at least one element selected from the group consisting of tantalum, niobium, boron, nickel, molybdenum, tungsten, vanadium, carbon and nitrogen.

7. The magnetic recording medium according to claim 6, wherein;
    the seed layer has a thickness of about 50 Å to about 1000 Å;
    the intermediate layer has a thickness of about 100 Å to about 300 Å;
    the underlayer has a thickness of about 50 Å to about 150 Å;
    the non-magnetic grain epitaxy layer has a thickness of about 10 Å to about 50 Å;
    the first magnetic layer has a thickness of about 50 Å to about 200 Å; and
    the second magnetic layer has a thickness of about 50 Å to about 200 Å.

* * * * *